United States Patent [19]

Whyte

[11] 3,925,728

[45] Dec. 9, 1975

[54] INDUCTION WATTHOUR METER FOR POWER SYSTEMS TRANSMITTING CARRIER COMMUNICATION SIGNALS

[75] Inventor: Ian A. Whyte, Pittsburgh, Pa.

[73] Assignee: Westinghouse Electric Corporation, Pittsburgh, Pa.

[22] Filed: Feb. 21, 1974

[21] Appl. No.: 444,583

[52] U.S. Cl. .................. 324/142; 324/52; 328/165; 340/310 R

[51] Int. Cl.² ...................... G01R 7/00; G01R 11/32

[58] Field of Search .......... 324/142; 325/42, 52, 65, 325/377, 473; 340/310 R, 310 A; 328/165

[56] References Cited

UNITED STATES PATENTS

| | | | |
|---|---|---|---|
| 1,924,303 | 8/1933 | Boddie | 340/310 |
| 2,860,324 | 11/1958 | Berger et al. | 340/310 |
| 3,697,975 | 10/1972 | Bernstein et al. | 340/310 |

*Primary Examiner*—Stanley T. Krawczewicz
*Attorney, Agent, or Firm*—R. W. Smith

[57] ABSTRACT

Magnetic sections of an induction watthour meter include metering coils for connection as elements of a terminating impedance network for power line carrier communication signals. Stator cores of the magnetic sections are made of a ferrite magnetic material so that the metering coils can have predetermined high frequency resonant circuit characteristics. The terminating impedance networks are integral to the watthour metering circuit to provide high impedances for terminating the communication signal to reduce undesired effects on the signals due to low impedance customer electric loads and wide variations in the loads. An alternative embodiment includes a terminating impedance network connected in a watthour metering circuit in which a low impedance circuit protects against interfering high frequency signals originating at a customer's premises.

7 Claims, 7 Drawing Figures

INDUCTION WATTHOUR METER FOR POWER SYSTEMS TRANSMITTING CARRIER COMMUNICATION SIGNALS

CROSS REFERENCE TO RELATED APPLICATIONS

This invention is related to U.S. application Ser. No. 444,587, filed Feb. 21, 1974, by I. A. Whyte et al, and assigned to the assignee of this invention.

BACKGROUND OF THE INVENTION

This invention relates to an induction watthour meter for customers connected to an electric power system transmitting power line communication signals and more particularly to a watthour meter having metering circuits connected in a resonant circuit tuned to the frequency of communication signals to form a terminating impedance network for a power line carrier communication system.

It is known to provide carrier communication signals through the conductors of a power line distribution system. In copending application Ser. No. 519,702 filed Oct. 31, 1974, which is a continuation of application Ser. No. 425,759, now abandoned, filed Dec. 18, 1973 by I. A. Whyte and assigned to the assignee of this invention, transmitter and receiver circuits are disclosed for interrogating and response communication terminals and for repeater circuits connected to the power line conductors of an electric power distribution network. The response communication terminals are typically located at each household or residential electric power customer for remote meter reading and selective load control. The customer wiring circuits and loads have been found to present adverse terminating impedance and interference conditions to the power line communication signals.

An induction watthour meter is usually connected to the power line entrance service conductors at the customer premises between the customer loads and the distribution network of a power system. It is usual practice to connect the customer response communication terminal also across the entrance service conductors supplying the customer load and between the customer watthour meter and the distribution network. Accordingly, the communication signals are terminated at the customer premises by the combined impedances of the metering circuit of a watthour meter, the customer loads and the inputs and outputs stages of a receiver and transmitter of the communication terminal. The receiver and transmitter impedances are fixed and are neglected for purposes of this invention. Both the watthour meter metering circuit and the customer power loads usually provide a very low impedance to the high frequency communication signals. The customer loads alone normally vary from very low values to high impedance values in a range in the order of 0.5 ohm to 50 ohms. The line impedance of conventional induction watthour metering circuits is contributed primarily by the current metering coil formed by a few turns of a large conductor having an impedance in the order of one ohm connected in series with the power line conductors. The combined meter and customer loads present a terminating impedance variation having a ratio of approximately thirty to one. A further condition of the customer load circuits that have undesired effects on the power line communication signals are interfering high frequency signals originating in home intercom systems or in unauthorized attempts to interfere with the reception or transmission of communication signals over the distribution network. In copending application Ser. No. 444,587 filed Feb. 21, 1974 concurrently with this application, by I. A. Whyte et al and assigned to the assignee of this invention, a terminating impedance arrangement is disclosed and claimed for a power line communication system. High impedance series and low impedance shunt circuits are discribed to protect the signals.

The laminated current and voltage stator cores of conventional watthour meters are known to have magnetic permeability characteristics for operation of an electromagnetic assembly of the meter at conventional electric power transmission frequencies of 60 Hertz in domestic systems and sometimes 50 hertz in foreign systems. The soft magnetic laminated core materials are known to lose their magnetic permeability and inductance characteristics and to have high electrical losses when providing the core elements of coils conducting high frequency carrier signals in the order of 20 to 400 KHz. Accordingly, since the customer electric load vary undesirably and the high frequency impedance characteristics of conventional watthour meter metering circuits are poor, it is desired to provide an improved watthour meter having a metering circuit including terminating impedance networks for termination of communication signals transmitted to a customer premises having electrical energy consumption measured by the metering circuit.

SUMMARY OF THE INVENTION

In accordance with this invention, an improved induction watthour meter for use with electric power systems connected in a power line carrier communication system includes a metering circuit including integral terminating impedance networks. The electromagnetic assembly of the watthour meter includes current and voltage magnetic sections forming the metering circuit connected to the power lines for measuring electric power consumption and for terminating high frequency carrier communication signals. Current and voltage stator cores of the magnetic sections are made of a ferrite magnetic material so that the current and voltage metering coils wound thereon form effective inductance elements of a resonant circuit tuned to the frequency bandwidth of power line carrier communication signals. The resonant terminating impedances of the current magnetic section include the current metering coil and a parallel connected capacitor to form a parallel resonant circuit as a terminating impedance network. The current coil network is connected in series with the power line conductors. The current coil parallel resonant network is tuned to the frequency bandwidth of the power line carrier signals to present a high impedance termination so that the effect of variations in the customer electric load on the carrier signals is substantially reduced. The resonant circuit of the voltage magnetic section includes the voltage metering coil and a parallel connected capacitor forming a parallel resonant terminating impedance network connected across the power line conductors transmitting high frequency carrier signals. The normally high impedance of the voltage meter coil having many turns of a small conductor is maintained at the communication signal frequencies to assure that the parallel connected voltage coil is isolated from the communication system.

In another preferred embodiment a high value capacitor is connected to the voltage metering coil to appear across the customer loads as a low impedance at the communication signal frequencies. The terminating impedance at the customer premises is substantially improved for the carrier signals and signal transmissions are protected from unauthorized interfering signals injected on the power lines from the customer premises.

It is a general feature of this invention to provide an improved induction watthour meter having one integral terminating impedance network for terminating high frequency carrier communication signals of a power line communication system so as to provide increased impedance at the remote customer communication terminals. The increased impedance afforded by the watthour meter terminating impedance network produces reduced combined terminating impedance variations due the customer load-varying conditions and reduces the combined effects of a number of terminating impedance variations at a plurality of customer premises having remote communication terminals connected to common power line conductors transmitting high frequency carrier communication signals. A still further advantage of this invention is to provide an induction watthour meter having a metering circuit which includes another integral terminating impedance network which isolates unauthorized interfering high frequency signals generated at the remote customer locations so as to prevent the interfering signals from being transmitted to the power line conductors transmitting high frequency carrier communication signals. Other advantages and features of this invention will become apparent from the description of the embodiments of the invention as shown in the drawings.

Description of the Preferred Embodiments

Figure 1:
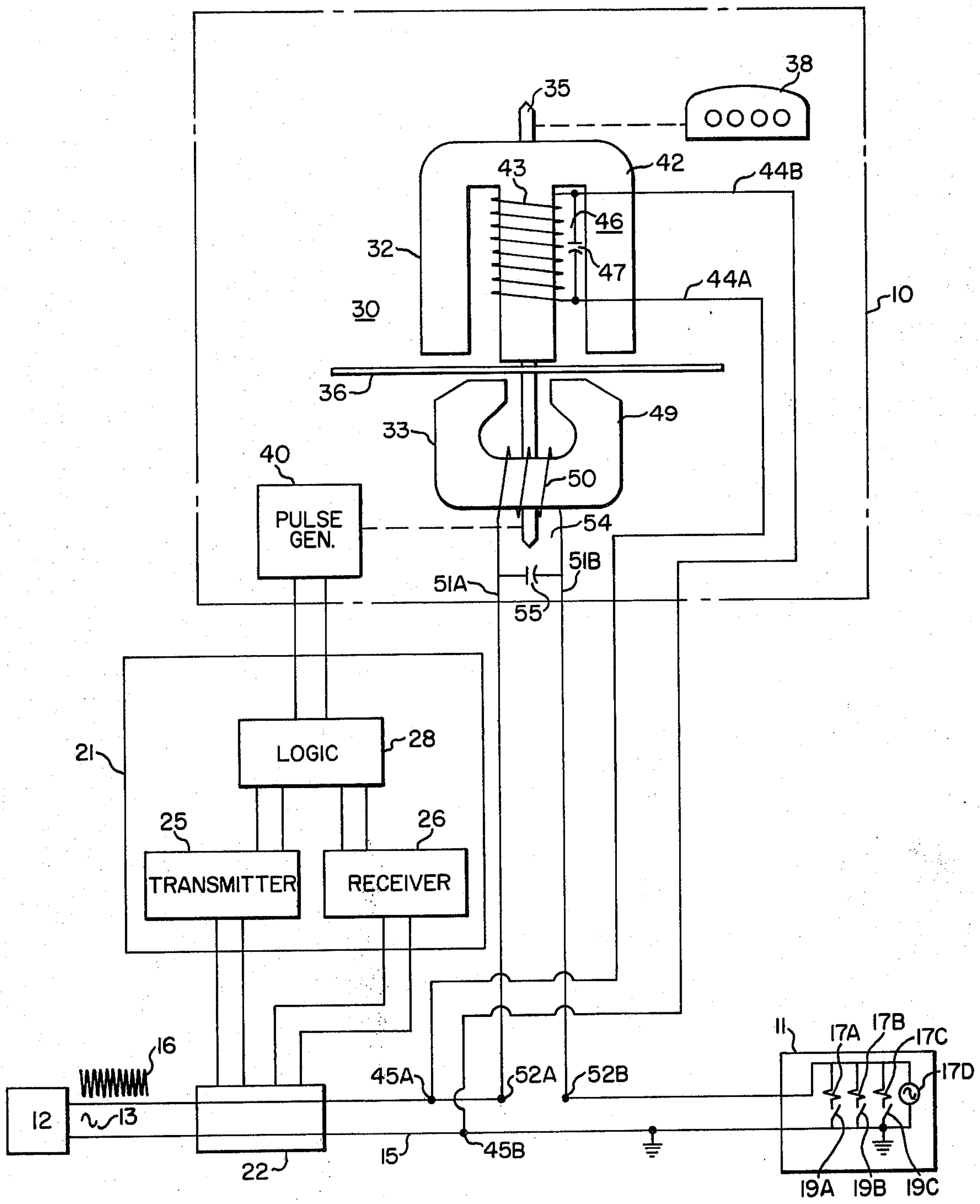
FIG. 1 is a schematic illustration of an induction watthour meter made in accordance with the present invention and connected to the power line conductors at a customer premises having a communication terminal of a power line carrier communication system.

Referring now to the drawing in which same numeral designates identical or like parts or elements in the several Figures and in particular to FIG. 1 there is illustrated an induction watthour meter 10 made in accordance with this invention for metering the electrical power consumption of a customer's electric load 11. A distribution network 12 supplies 60 $H_3$ power signals 13 to power line conductors 14 and 15. These conductors 14 and 15 are provided by entrance service conductors connections between an electric power system including the power distribution network 12 supplying the customer load 11. The power line conductors 14 and 15 are a simplified representation of various known combinations of distribution network conductor arrangements for supplying the electric load 11 and also transmitting high frequency carrier communication signals 16 as noted further hereinbelow. It is assumed that conventional 120V. 60 Hz electric power signals 13 are supplied through the conductors 14 and 15 wherein conductor is grounded as shown.

The customer electric load 11 at the customer premises are formed by a plurality of primarily resistance load devices 17A, 17B and 17C. Switches 19A, 19B and 19C selectively connect the resistance devices 17A, 17B and 17C, respectively, to the conductors 14 and 15. Accordingly, the impedance values of the customer load 11 may vary, typically between approximately 0.5 ohm to 50 ohms. The load 11 also includes a signalling device 17D which is a source of high frequency signals that are in a frequency bandwidth that can interfere with the signals 16 or other signals of the distribution network. The device 17D may be a home intercom system or a signal generator intended to jam or interfere with signals of a power line carrier communication system. For purposes of this description, the watthour meter 10 is described as that being used at a residential or household type customer's premises, however, the watthour meter of this invention is not limited to such applications. The residential customer load 11 varies as indicated above and the resistance devices 17A, 17B and 17C are typically lighting and heat producing resistance load devices which are utilized at residential customer premises.

A customer remote communication terminal 21, which may be of the response terminal type disclosed in copending application Ser. No. 425,759, filed Dec. 18, 1973, by I. A. Whyte and assigned to the assignee of this invention, is coupled to the conductors 14 and 15. A suitable coupler 22 connects the high frequency bandwith within a range of about 20kH$_3$ to 400 kH$_3$, between the conductors 14 and 15 and a transmitter 25 or a receiver 26 of the terminal 21 that are of types described in the aforementioned copending application. The transmitter 25 and the receiver 26 are connected to a logic circuit 28 to transmit meter reading information of the watthour meter 10 or to transmit and receive other control or data information associated with a customer premises. The operation of the customer response terminal 21 generally includes communication with a central interrogation terminal, not shown, through distribution power line conductors.

The induction watthour meter 10 generally includes a metering circuit 30 comprising an electromagnetic assembly including voltage and current magnetic sections 32 and 33. The voltage and current magnetic sections 32 and 33 included in the metering circuit 30 form an important feature of this invention. It is initially noted that the measuring operation of the watthour meter 10 is in accordance with known principles of operation of such meters as described in the Electrical Meter Men's Hankbook, 7th Edition, published by Edison Electric Institute, page 91 et seq. Accordingly, an electroconductive disc 36 is rotated in response to the magnetic fields of the voltage and current magnetic sections 32 and 33 so as to have a rate of rotation responsive to the electrical power furnished by voltage and current components of the electric power signals 13 applied to the magnetic sections 32 and 33. A disc supporting shaft 35 drives a kilowatt hour dial register 38 for visually indicating the consumption of electrical energy by customer load 11 as is well understood by those skilled in the art of induction watthour meters.

Where the customer premise is included in a power line carrier communications system, remote metering information is provided from the meter 10 by a pulse generator 40 driven by the meter shaft 35. The pulse generator 40 can be made as disclosed in U.S. Pat. No. 3,733,493 to T. M. McClelland issued May 15, 1973, and assigned to the assignee of this invention. The pulses from the pulse generator 40 are typically applied to the logic circuit 28 of the response communication terminal 21. The logic circuit 28 may be made in accordance with the application Ser. No. 291,469, filed Sept. 12, 1973, by L. C. Vercellotti et al and assigned to the assignee of this invention. The logic circuit 28 accumulates and encodes a binary logic signal representative of the reading of the register 38 and the measured electric energy consumption. The transmitter 25 translates the logic signal into a frequency shift modulated carrier signal which is applied through the coupler 22 and to the power line conductors 14 and 15 as indicated by the signal 16. Normally, the encoded meter information is sent after an interrogation carrier signal is received by the receiver 26 from a central interrogating communication terminal. This interrogating data is applied by the receiver 26 to the logic circuit 28 to command it to transmit the meter reading or other data and control information through the transmitter 25 to the central interrogating terminal as described in the aforementioned application Ser. No. 425,759.

Referring now in particular detail to the metering circuit 30 of the induction watthour meter 10, the voltage magnetic section 32 includes a stator core 42 made of a ferrite magnetic material and supports a voltage coil 43 which is connected by coil lead conductors 44A and 44B to the terminal junctions 45A and 45B with the conductors 14 and 15, respectively. This supplies the voltage component of the power signal 13 appearing across these conductors 14 and 15 and essentially across the customer load 11 to the voltage metering coil 43. The voltage magnetic section 32 is included in a terminating impedance network 46 comprising a parallel resonant circuit including the metering coil 43 and a capacitor 47 connected across the coil 43. The coil 43 is tuned to the frequency bandwidth including the high frequency carrier communication signals 16 and forms a tuned element with capacitor 47 in a manner similar to that described hereinbelow for a resonant circuit included in the current magnetic section 33. Accordingly, a parallel resonant circuit which is known to have a high impedance is formed by the coil 43 and capacitor 47. Due to the ferrite stator core 42 and the large number winding turns of the voltage coil 43, the coil 43 has a high impedance to the communication signals 16. The tuned resonant circuit of the network 46 assures a predetermined high impedance for the coil 43 to avoid adverse shunting of the signals across the lines 14 and 15.

The current magnetic section 33 includes a current stator core 49 having wound thereon a current metering coil 50. The stator core 49 is made of the ferrite magnetic material of the same type forming the voltage stator core 42. The current metering coil 50 includes coil lead conductors 51A and 51B connected in series with the power line conductor 14 at the terminal junctions 52A and 52B so as to be supplied a current component of the power signal 13 furnished through the conductors 14 and 15 to the customer electrical load 11. The current magnetic section 33 also includes a terminating impedance network 54 comprising a resonant circuit which includes a capacitor 55 connected in parallel across the current metering coil 50. The metering coil 50 is tuned to the frequency of the carrier communication signal 16 transmitted on the power line conductors 14 and 15 to provide a high terminating impedance value in series with the conductors 14 and 15 and the customer load 11 in the frequency band of the signals 16.

A ferrite magnetic material is used for the voltage and current stator cores 42 and 49 since it is known to have useful magnetic properties particularly applicable at high frequencies as noted in the book "Ferromagnetism" by R. M. Bozorth published 1955 by D. Dan Nostrand Co., Inc. at page 244 et seq. The important feature of the ferrite materials is their low energy loss in high frequency alternating fields. Since the resistivity is high, the eddy current loss is quite small and the permeability remains high in a frequency range of the high frequency carrier communication signals i.e., 20 KHz to 400 kHz. The cores are formed into the same general configuration as provided in conventional induction watthour meter voltage and current stator cores being normally formed of a laminated iron magnetic material. The conventional laminated magnetic material of induction watthour meters has substantial losses in the aforementioned range of carrier signal frequencies and has high losses and substantially low values of permeability and inductance at these signal frequencies. The ferrite material is initially in a powdered form which is compressed and sintered to provide the configuration of the cores 42 and 49 shown in FIG. 1. The laminated magnetic materials conventionally used in watthour meters are considered to be more advantageous when the watthour meter is used on power lines only conducting the sixty $H_3$ electric power signals. When the watthour meter 10 is connected to conductors which also have the high frequency carrier communication signals 16, the advantage of having integral terminating impedance networks in a watthour metering circuit, as disclosed herein, is considered as an offsetting advantage from the slightly reduced performance in the watthour metering operation. The capacitance elements can slightly alter the watthour meter operation but effectively the change is very small.

Figure 2A:
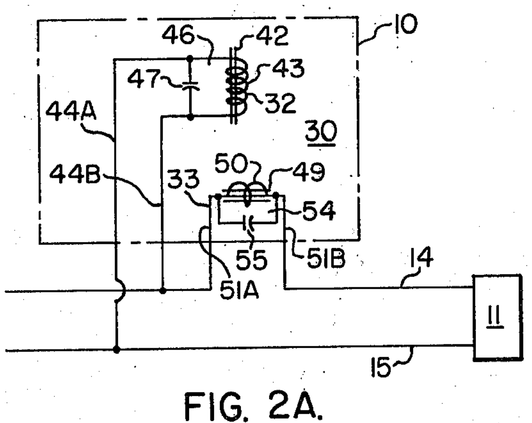
FIG. 2A, is an electrical circuit diagram illustrating the metering circuit of the watthour meter shown in FIG. 1.
Figure 2B:
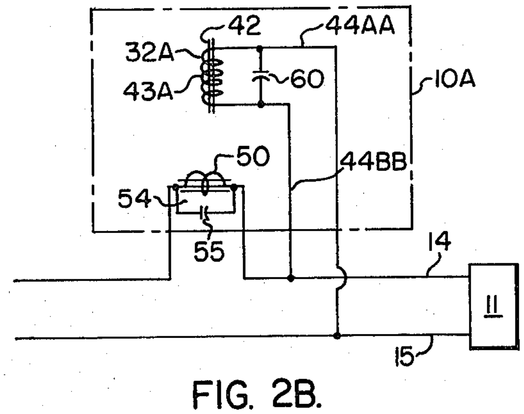
FIGS. 2B and 2C are alternative forms of the metering circuit shown in FIG. 2A.
Figure 2C:
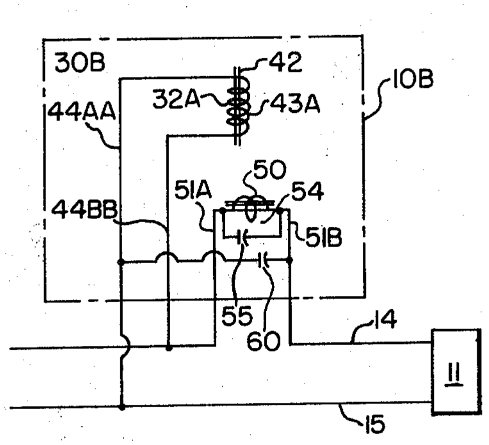

FIG. 2A is a separate electrical schematic diagram of the metering circuit 30 including the terminating impedance networks 46 and 54 in the watthour meter 10. The same numerals are used to designate the same electrical elements shown in FIG. 1 and the elements are shown in a simplified form to aid in understanding the invention as described above in connection with the description of FIG. 1. Alternative metering circuit embodiments 30A and 30B of the metering circuit 30 are shown in FIGS. 2B and 2C in which the current magnetic section 33 is the same as in FIG. 2A for alternative watthour meters 10A and 10B connected to the identical conductors 14 and 15 and customer load 11. A voltage metering coil 43A is included in a voltage magnetic section 32A which is substantially identical to section 32 in FIGS. 1 and 2A except that it does not form a tuned element of a resonant circuit such as provided in the terminating impedance network 46.

In FIGS. 2B and 2C a large value capacitor 60 is connected across the coil lead conductors 44AA and 44BB in the metering circuit 30A of FIG. 2B and across the coil lead conductors 44AA and 51B. The capacitor 60 forms a single element terminating impedance network which defines a predetermined low impedance path to the high frequency communication signal 16 in shunt relationship to the customer load 11. The different connections of the capacitor 60 in metering circuits 30A and 30B are required to accomodate the different voltage metering coil 43A connections when made either on the customer side as in circuit 30A of FIG. 2B or on the line side as in circuit 30B of FIG. 2C. It is more general practice to connect a voltage coil on the line side as in FIGS. 2A and 2C. The low impedance termination provided by the capacitor 60 in combination with the terminating impedance network 54 of the current section 33 further improves the effectiveness of the high impedance termination of network 54 under varying customer load conditions. Further, the capacitor 60 protects the customer communication terminal 21 and the associated power line carrier communication system from interfering signals originating at the customer premises such as by the signalling device 170 in the customer load 11 shown in FIG. 1.

Referring now further to the operation of this invention initially, the resonant circuit of the terminating impedance network's 54 including the current metering coil 50 is considered since it is connected in series with the conductor 14. The voltage metering coil 43 is connected in parallel to connectors 14 and 15 and it may not be necessary to include the capacitor 47 across it. Typically, the reactance of the voltage metering coil will be very high in the kilohertz frequency range and therefore very little current will pass through the coil. Thus, the parallel resonant circuit provided by the capacitor 47 may be neglected for providing a high effective coil impedance to the communication signals 16 across the conductors 14 and 15.

It is known in a parallel resonant circuit, such as formed by the resonant circuit terminating network 54, that the maximum impedance occurs to signals at the resonant frequency of the circuit. Since the customer electric load 11 may vary between approximately 0.5 ohm and 50 ohms it it desired that a high and substantially constant combined terminating impedance be provided for the high frequency communication signals 16. The current metering coil 50 has a high quality or Q factor since it has a core formed by the ferrite stator core 49. The coil Q factor is the ratio of the equivalent loss resistance divided by $2\pi fL$ and it is known that the impedance Z is equal to $Q(2\pi fL)$. In one preferred embodiment, the resonant circuit 54 has a tuned resonant impedance of 60 ohms when the carrier frequency has a frequency of about 60 kHz. The Q factor of the coil is established at about 100 and the inductance of the current metering coil 50 is in the order of 1.6 microhenries. Since the coil 50 is tuned to the resonant frequency of the resonant circuit of the network 54, the capacitor 55 has a value in the order of 4.4 microfarad.

With the resonant circuit including current coil 50 and capacitor 55 tuned to the mid frequency bandwidth of the carrier communication signal 16 so as to have a tuned resonant impedance of 60 ohms, the combined terminating impedance to the signal 16 includes the sixty ohms of the resonant circuit terminating network 54 and the maximum and minimum impedances of 0.5 ohm and 50 ohms of the customer electric load 11. Accordingly, a maximum combined terminating impedance, neglecting the small resistance of the current coil 50, of 110 ohms and a minimum impedance of 60.5 ohms is provided which changes between minimum and maximum load conditions of the customer load 11 with the resonant circuit of the terminating impedance network 54. Accordingly, a ratio of maximum to minimum impedance change for the power line carrier communication signals 16 is in the order of 2:1 rather than without the improved metering circuit 30 with the network 54 when the impedance variation is in the order of 30:1, as noted hereinabove.

In FIGS. 2B and 2C the voltage magnetic section 32A including the capacitor 60 of metering circuits 30A and 30B a low impedance at the mid frequency of the carrier communication signal 16, as also noted hereinabove. For example, when the capacitor 60 has a value of 0.5 microfarad the impedance provided by the capacitor 60 at the frequency of 60 kHz is in the order of 5.3 ohms. The capacitor 60 is connected in parallel across the conductors 14 and 15 so as to also be in parallel with the customer load 11. Accordingly, the combination of the impedance 60 connected in parallel with the load 11 makes the combined load variation to the communication signal 16 substantially reduced from that when the capacitor 60 is not provided. For example, at the minimum impedance condition of 0.5 ohm of the customer load 11, the parallel connected 5.3 ohm load of the capacitor 60 at the carrier communication signal frequency is substantially bypassed by the 0.5 ohm load impedance. When the customer load 11 is at the maximum impedance in the order of fifty ohms, the capacitor impedance of 5.3 ohms is substantially lower than the customer impedance and effectively provides all, the total resistance of the parallel combination which is in the order of 5.33 ohms. Accordingly, the termination impedance variation of the parallel combination is between essentially 0.5 ohms and 5.33 ohms. When the combined parallel impedances of the capacitor 60 and the load 11 are combined with the impedance of the resonant circuit network 54, the combined termination impedance has a variation between the sum of 60 ohms plus 5.33 ohms or a maximum impedance of approximately 65.3 and the sum of sixty ohms plus 0.5 ohms or 60.5 ohms provides the minimum termination impedance. Thus, the terminating impedance variation between 60.5 ohms and 65.3 ohms is reduced to ratio of approximately 10 percent. This substantially reduces the problem of design of the transmitter and receiver output stages to accomodate variations in the signal termination impedances also, the power required for establishing the the minimum signal strength of the carrier signal being received at the receiver 26 is substantially reduced by maintaining a higher termination impedance at low impedance conditions of the customer load 11.

It is contemplated that a capacitor may be connected in series with the voltage metering coil 43 to form a series resonant circuit terminating impedance network which would be tuned to the band of the communication signal 16. This would also provide a minimum impedance network connected across the conductors 14 and 15. The arrangement shown in FIGS. 2B and 2C is considered preferable in which a value of the capacitor 60 is selected so as to have a low impedance at the carrier frequency as previously described.

An added important feature of providing the capacitor 60 as a single element terminating impedance network of the metering circuits 30A and 30B in FIGS. 2B and 2C is that this arrangement isolates unauthorized signals which are generated or applied to the conductors 14 and 15 at the customer premises, for example, from the signalling device 17D in the customer load 11 shown in FIG. 1, as also noted above. For example, when the customer load has a maximum impedance value of 50 ohms, an interfering signal applied across the load 11 has a substantially lower impedance presented toward the distribution network and the signals would go out on the conductors 14 and 15 into the distribution network when the interfering signals has a frequency in the bandwidth of the communication signals 16 i.e., approximately sixty kHz. Since the capacitor 60 has an impedance of approximately 5 ohms at the communication signal frequency, the signal from the interfering signal generating device 17D would be substantially lower than the maximum impedance of the electric load 11 i.e., 50 ohms so that a substantial major portion of the power of the signal generating device 170 would be bypassed through the low impedance of the capacitor 60. At the low impedance conditions of the customer lead 11, more of the interfering signals would pass into the load 11 and be effectively dissipated therein. Accordingly, the terminating impedance network provided by the capacitor 60 is especially required at the higher impedance conditions of the customer load 11.

Figure 3:
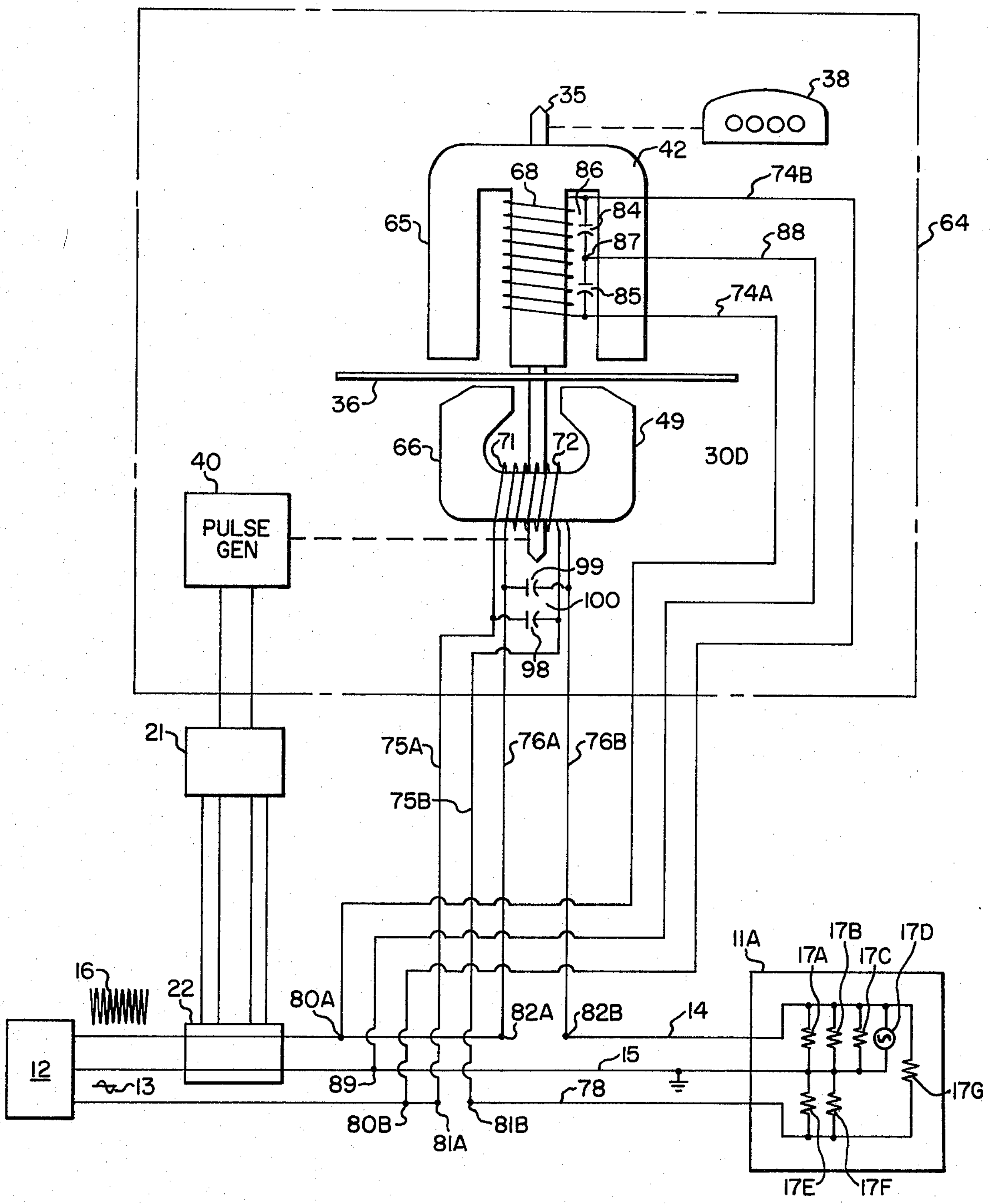
FIG. 3 is a schematic illustration of an alternative embodiment of the watthour meter shown in FIG. 1.

Referring now to FIG. 3, there is shown an alternative embodiment of this invention in which an induction watthour meter 64 having a metering circuit 30D is of a common type for use at residential customers referred to as a 240 volts single stator three wire meter. The wattmeter parts are substantially identical to the corresponding parts of the induction meter 10 shown in FIG. 1. These corresponding parts are designated by the same numeral in FIG. 3 and are to be considered as like elements as described herein above in the description of FIG. 1. A primary difference of the voltage magnetic section 65 and of the the current magnetic section 66 of the meter 64 from the corresponding magnetic sections of the meter 10 is that the voltage metering coil 68 is provided on the stator core 42 for connection to a 240 volts component of the measured electric power signal 13 and the current magnetic section 66 includes two current metering coils 71 and 72. The coil lead conductors 74A and 74B are provided for the voltage metering coil 68 and, coil conductors 75A and 75B and 76A and 76B are provided for the two current metering coils 71 and 72. The conductors 14 and 15 correspond to the same conductors in FIG. 1 with the conductor 15 being considered a grounded neutral and a third conductor 78 defines a three wire 120/240 volts power distribution arrangement with the conductors 14 and 15. 120 volts is developed between either of the conductors 14 or 78 and the grounded neutral conductor 15 and 240 volts is developed across the conductors 14 and 78 in a conventional manner. The voltage coil conductors 74A and 74B are connected across the line conductors 14 and 78 at terminal junctions 80A and 80B, respectively. The current coil conductors 75A and 75B, and 76A and 76B are connected in series with the line conductors 78 and 14 at terminal junctions 81A and 81B and 82A and 82B, respectively. The customer electric load 11A includes the resistance devices 17A, 17B, 17C and the signalling devices 17A, 17B, 17C and the signalling device 17D connected as in load 11 of FIG. 1 with the switches removed. Further resistance device 17E and 17F are connected across the grounded neutral conductor 15 and the conductor 78 and a 240 volts rated resistance device 17G is connected across the two line conductors 14 and 78. The customer load 11A has essentially the same load variation characteristics and the signalling device 170 is capable of generating potentially interfering signals as described for customer 11.

The coupler 22 connects the carrier communication signal 16 on the conductors 14 and 15 to the customer response communication terminal 21 in the same manner as described in connection with FIG. 1. Meter reading data developed by pulses from the pulse generator 40 or other control and data information may be communicated to the customer premises having the meter 64 through the power line communication system associated with the distribution network 12 supplying the conductors 14 and 15, as also described in connection with FIG. 1.

In voltage magnetic section 65 capacitors 84 and 85 are connected in series across conductors 74A and 74B and thereby across the voltage metering coil 68 to form a terminating impedance network 86. The junction 87 between the capacitors 84 and 85 is connected to the grounded neutral conductor 15 via the lead conductor 88 at terminal junction 89. This connects the capacitors 84 and 85 across the conductors 15–78 and 15–14 and across the line-side of the meter connections. The capacitors 84 and 85 and the voltage metering coil 68 form a tuned resonant circuit tuned to the frequency band of the communiciation signal 16. Thus the terminating impedance network 86 forms a high impedance termination corresponding to the network 46 shown in FIG. 1.

Figure 4B:
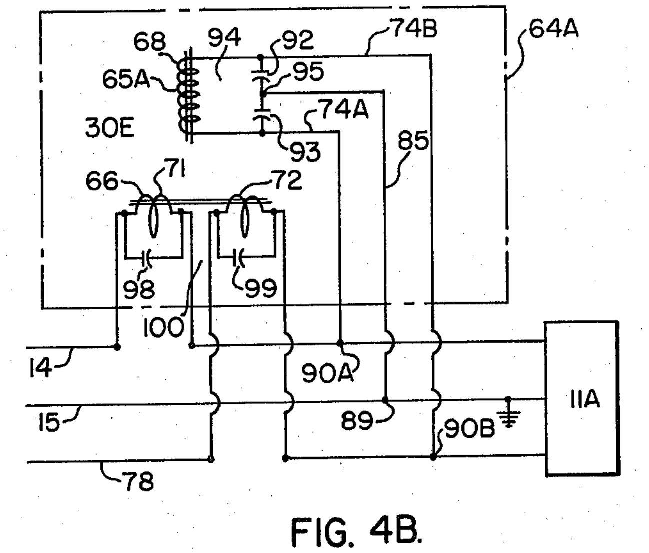
FIG. 4B is an alternative form of the metering circuit shown in FIG. 4A.
Figure 4A:
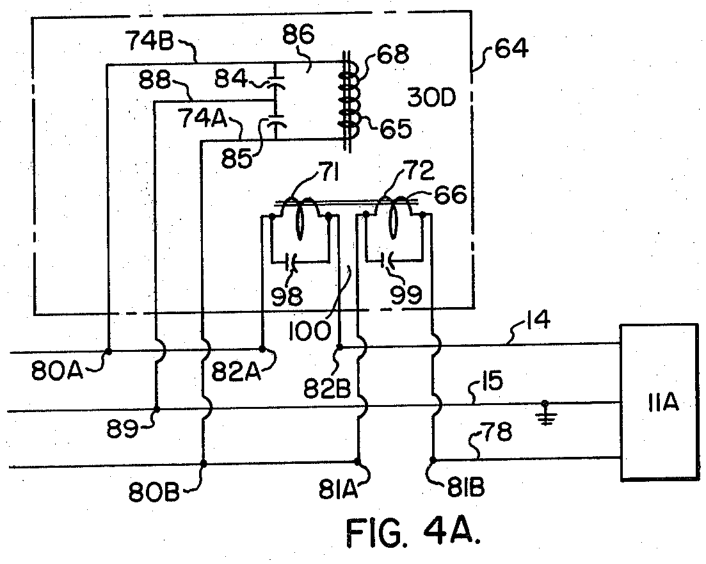
FIG. 4A is an electrical circuit diagram illustrating the metering circuit of the watthour meter shown in FIG. 3

FIG. 4A illustrates an electrical circuit diagram of the metering circuit 30D in the watthour meter 64 shown in FIG. 3. FIG. 4B illustrates an electrical circuit diagram of a metering circuit 30E in a watthour meter 64B. The voltage magnetic section 65A of metering circuit 30E is an alternative embodiment of the voltage section 65 of the metering circuit 30D wherein the voltage metering coil 68 is connected by the lead conductors 74A and 74B to the terminal junctions 90A and 90B, respectively, of the conductors 14 and 78 on the customer load side of the meter connections.

The capacitors 92 and 93 are connected in series across the coil 68 to form a low terminating impedance network 94. The junction 96 is connected by lead conductor 88 to the terminal junction 89 of the conductor 15. The network 94 corresponds to the capacitor 60 shown in FIG. 2B and described hereinabove. Thus, a low impedance path is provided in parallel with the customer load 11A so that when unauthorized interfering signals are produced by the signalling device 170 the capacitor 92 presents a shunting path at the frequency band of the communication signal 16 to prevent interference with the communication system and the signal 16.

In a current magnetic section 66 of the metering circuit 30D in the meter 64, capacitors 98 and 99 form resonants with the current metering coils 71 and 72, to define a terminating impedance network 100 in the same manner as does the capacitor 55 forms a resonant impedance element with the current metering coil 50 in the terminating impedance network shown in FIG. 1. Accordingly, parallel resonant circuits are formed when the current metering coils 67 and 68 are tuned to the band of the communication carrier signal 16 and are connected between the response communication terminal 21 and the customer load 11A to the conductors 14 and 15. A parallel resonant circuit is formed by the metering coil 71 and capacitor 98 at the carrier signal frequency. This forms the high impedance for terminating the communication signal 16 in the manner as described in connection with FIG. 1. It is to be noted that the coupler 22 can be connected to the conductors 15 and 78 in which case the capacitor 92 forms a low terminating impedance termination in the voltage magnetic section 65A for protection against unauthorized interfering signals. The current metering coil 72 and capacitor 99 form a parallel resonant circuit providing a high terminating impedance termination in the current magnetic section 66 in the alternate connection of the coupler 22.

If the coupler 22 is coupled to the line conductors 14 and 78, both of the parallel resonant circuits of the terminating impedance network 100 of the current magnetic section 66 will be connected in circuit with the power line carrier signals. The capacitors 92 and 93 in the voltage magnetic section 65A are connected in series to form the protecting low impedance feature affording isolation and prevention of interference of unauthorized signals applied from the customer load 11A. Similarly, in connection with the metering circuit 300 shown in FIGS. 3 and 4A, the high terminating impedance network 86 affords a parallel resonant circuit for any of the alternative connections of the coupler 22 noted above.

It is to be noted that if there is close mutually coupling between the current metering coils 71 and 72 only one of the capacitors 98 or 99 is required and effectively the capacitance of the remaining capacitor will be developed across the coil not having a capacitor. Also, if the lead conductors 74A and 74B have close mutual coupling either of capacitors 84 and 85 and either of the capacitors 92 and 93 may be omitted and the capacitance of the remaining capacitor will also effectively replace the capacitance of the omitted capacitor.

It is apparent due to the different arrangements of watthour meter metering circuits, for example, for different two, three and four wire distribution network conductor arrangements and also in which there may be two or three electromagnetic assemblies for polyphase distribution networks, terminating impedance networks can be made in combination with the voltage magnetic sections and current magnetic sections in accordance with this invention as described for the embodiments of FIGS. 1 through 4B. As is noted hereinabove, the high impedance parallel resonant circuit terminations of the networks 54 or 100 in the current magnetic sections 33 or 66 may be used without utilizing the low impedance capacitor terminating impedance networks of capacitor 60 or of network 94 or the high impedance networks 46 and 86 described hereinabove for the voltage magnetic sections 32 and 65. Other modifications and alternative embodiments will be apparent to those skilled in the art without departing from the spirit and scope of this invention.

I claim as my invention:

1. An induction watthour meter for power systems transmitting carrier communication signals, comprising: an electromagnetic assembly including a voltage magnetic section having stator core made of a ferrite magnetic material and a current magnetic section having stator core made of a ferrite magnetic material; a voltage metering coil on said stator core of said voltage magnetic section; and a current metering coil on said stator core of said current magnetic section so as to define a metering circuit including said voltage and current metering coils connectable to power line conductors of a power system for measuring the consumption of electrical energy of a customer electric load with said power line conductors transmitting high frequency carrier signals of a communication system connected to said power system; a terminating impedance network including said current metering coil and a capacitor element connected together to define a parallel resonant circuit tuned to said carrier signals such that said resonant circuit presents a predetermined value of impedance that is higher than the impedance of said customer electric load to said carrier signals when occurring in the same power line conductors supplying the electrical energy to the customer load.

2. An induction watthour meter for power system transmitting carrier communication signals as claimed in claim 1 wherein said watthour meter includes a further terminating impedance network including the voltage metering coil and a further capacitor element connected together to define a parallel resonant circuit tuned to said carrier signals such that said resonant circuit presents a predetermined value of impedance that is higher than the impedance of voltage metering coil alone to the carrier signals.

3. An induction watthour meter for power systems transmitting carrier communication signals as claimed in claim 1 wherein said watthour meter includes a still further terminating impedance network including a still further capacitor element connected in parallel with said voltage metering coil so as to have a predetermined value of impedance that is substantially lower than a maximum value of impedance of the customer electric load to the carrier signals so as to form a shunting path to an interfering high frequency signal generated at the customer load.

4. An induction watthour meter for power systems transmitting carrier communication signals as claimed in claim 1 wherein the voltage metering coil is connected in the metering circuit for connection on the line side relative to the customer load side of the metering circuit connections; and includes a still further terminating impedance network including a still further capacitor element connected between said voltage metering coil and said current metering coil so as to be connected across the customer electric load and having a predetermined value of impedance that is substantially lower than a maximum value of impedance of the customer electric load to the carrier signals so as to provide a shunting path to an interfering high frequency signal generated at the customer load.

5. An induction watthour meter for power systems transmitting carrier communication signals, comprising an electromagnetic assembly including a voltage magnetic section having stator core made of ferrite magnetic material and a current magnetic section having a stator core made of a ferrite magnetic material; a voltage metering coil on said stator of said voltage magnetic section; first and second current metering coils on said stator core of said current magnetic section so as to define a metering circuit including said voltage metering coil and said first and second current metering coils connectable to power line conductors of a three-wire distribution network power system for measuring the consumption of electrical energy of a customer electric load with said power line conductors transmitting high frequency carrier signals of a communication system connected to said power system; a first terminating impedance network including said first and second metering coils and further including first and second capacitor elements connected to define parallel resonant circuits tuned to said carrier signals such that either of said parallel resonant circuits present a predetermined value of impedance that is higher than the impedance of said customer electric load to said carrier signals when occurring in the power line conductors supplying the electrical energy to the customer load; and a second terminating impedance network including third and forth capacitor elements connected in series and across said voltage metering coil with the junction of said third and fourth capacitor elements being connectable to a grounded neutral conductor of the three wire network.

6. An induction watthour meter for power systems transmitting carrier communication signals as claimed in claim 5 wherein said second terminating impedance network forms a parallel resonant circuit having said voltage metering coil tuned to said carrier signals.

7. An induction watthour meter for power systems transmitting carrier communication signals as claimed in claim 5 wherein said third and fourth capacitors of said second terminating impedance network define a low impedance path having a predetermined value of impedance substantially lower than a maximum value of impedance of the customer electric load when the voltage metering coil is connected to the customer load side relative to the line side of the metering circuit connections; whereby either of said third and fourth capacitors form a shunting path to an interfering high frequency signal generated at the customer load.

* * * * *